# (12) United States Patent
Berson

(10) Patent No.: US 6,802,005 B1
(45) Date of Patent: *Oct. 5, 2004

(54) METHOD AND SYSTEM FOR TRACKING A PERSON'S TIME AT A LOCATION

(75) Inventor: William Berson, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/540,689

(22) Filed: Oct. 11, 1995

(51) Int. Cl.[7] .............................. H04L 9/00; G06F 17/00
(52) U.S. Cl. .......................... 713/178; 713/186; 705/32
(58) Field of Search ............................ 380/23, 25, 51, 380/30; 705/30, 32, 400, 405, 44, 17; 713/176, 178, 179, 185, 186

(56) References Cited

U.S. PATENT DOCUMENTS

| | | | | |
|---|---|---|---|---|
| 3,997,723 A | * | 12/1976 | Sandin | 178/7.8 |
| 4,757,543 A | * | 7/1988 | Tamada et al. | 380/51 |
| 4,993,068 A | * | 2/1991 | Piosenka et al. | 380/23 |
| 5,001,752 A | * | 3/1991 | Fischer | 380/23 |
| 5,022,080 A | * | 6/1991 | Durst et al. | 380/23 |
| 4,853,961 A | * | 8/1991 | Pastor | |
| 5,117,353 A | * | 5/1992 | Stipanovich et al. | 374/401 |
| 5,189,700 A | * | 2/1993 | Blandford | 380/23 |
| 5,337,358 A | * | 8/1994 | Axelrod et al. | 380/23 |
| 5,384,846 A | * | 1/1995 | Berson et al. | 380/23 |
| 5,420,924 A | * | 5/1995 | Berson et al. | 380/23 |
| 5,444,780 A | * | 8/1995 | Hartman, Jr. | 380/30 |
| 5,469,506 A | * | 11/1995 | Berson et al. | 380/23 |
| 5,499,293 A | * | 3/1996 | Behram et al. | 380/4 |
| 5,500,897 A | * | 3/1996 | Hartman, Jr. | 380/25 |
| 5,550,359 A | * | 8/1996 | Bennett | 235/382 |
| 5,742,685 A | * | 4/1998 | Berson et al. | 380/25 |

* cited by examiner

Primary Examiner—Gilberto Barron
(74) Attorney, Agent, or Firm—Ronald Reichman; Robert Whisker; Angelo N. Chaclas

(57) ABSTRACT

A method and system for tracking the time spent by an employee at a job site. The employee is provided with an identification card which includes an encrypted representation of a biometric characteristic of the employee. When the employee arrives at, or leaves, the job site the biometric characteristic recorded on the identification card is compared to the characteristic as directly sensed from the employee and, if the comparison is successful, the approximate time as derived from a secure clock, is recorded.

7 Claims, 2 Drawing Sheets

METHOD AND SYSTEM FOR TRACKING A PERSON'S TIME AT A LOCATION

BACKGROUND OF THE INVENTION

The subject invention relates to a method and system for identifying a person. More particularly, it relates to a method and system for identifying a person and tracking the time that person spends at a particular location.

Tracking the time that a person spends at particular locations is often desirable but frequently difficult. In particular, keeping track of employee work hours is both a business and legal requirement. In large construction contracts there can be large numbers of casual or temporary employees, with a high turn over, working for multiple contractors and subcontractors at multiple job sites and represented by multiple unions. Despite the difficulties such circumstances clearly present, accurate time records must be kept of the time spent by each particular employee at each job site or location. These records form the basis for both paying the employees and if the contract is not a firm fixed price contract, the costs billed to the customer.

Under these circumstances the temptation and opportunity for fraud are high, both for the employer and the employee. Cases of "no show" jobs and phantom workers are often in the news.

In response to this problem employee time clocks in which an employee's hand geometry is read in lieu of punching a time card have been introduced. Although such time clocks are resistant to fraud they require reprogramming with an employee's identity and hand geometry each time a new employee is hired, an employee leaves, or an employee is transferred from one site to another.

Thus it is an object of the subject invention to provide a system for tracking the time spent by a particular person at a particular location which is suitable for use with large, rapidly changing groups of person who may be at one or more of a large group of locations.

BRIEF SUMMARY OF THE INVENTION

The above object is achieved and the disadvantages of the prior art are overcome in accordance with the subject invention by means of a system and method for tracking the time spent by a person at a location. The person is provided with identification which includes an encrypted representation of a selected biometric characteristic of the person. (By biometric characteristic herein is meant any substantially constant physical characteristic of a person which can be sensed to generate a signal representative of that characteristic, such as fingerprints, hand geometry, facial features, etc.) The system includes a clock and a mechanism for comparing the encrypted representation with the biometric characteristic as directly sensed from the person. Inputs to the comparison mechanism for the encrypted representation and for directly sensing the biometric are physically present at the location. The system also includes a mechanism responsive to the clock and the comparing mechanism for recording the person's times of arrival at, and departure from the location if the comparison mechanism verifies the persons identity.

In accordance with the method of the subject invention, the selected biometric characteristic is directly sensed from the person whose time is to be tracked, while at the same time the encrypted representation of the biometric characteristic is input and decrypted to produce two signals representative of the biometric characteristic. If the two signals compare then the approximate time of the comparison (e.g. the time may be adjusted to allow for the time required to operate the system) is recorded as a time of arrival at, or departure from the location. These steps are then repeated each time the person arrives or departs from the location to establish a record of time spent by the person at the location.

In accordance with one aspect of the subject invention the system further includes a mechanism for providing the identification to the person.

In accordance with a second aspect of the subject invention, the providing mechanism communicates with a data processing center to record provision of the identification to the person.

In accordance with another aspect of the subject invention, the system clock is secure against being reset by unauthorized parties.

In accordance with another aspect of the subject invention, the system includes a mechanism for printing an encrypted record of the persons time at the location.

In accordance with still another aspect of the subject invention, the person is an employee and the system communicates with a data processing center to record the persons time at said location, and the data processing center determines the person's wages in accordance with the time spent by the person at the location.

DETAILED DESCRIPTION OF PREFERRED EMBODIMENTS OF THE SUBJECT INVENTION

Figure 1:
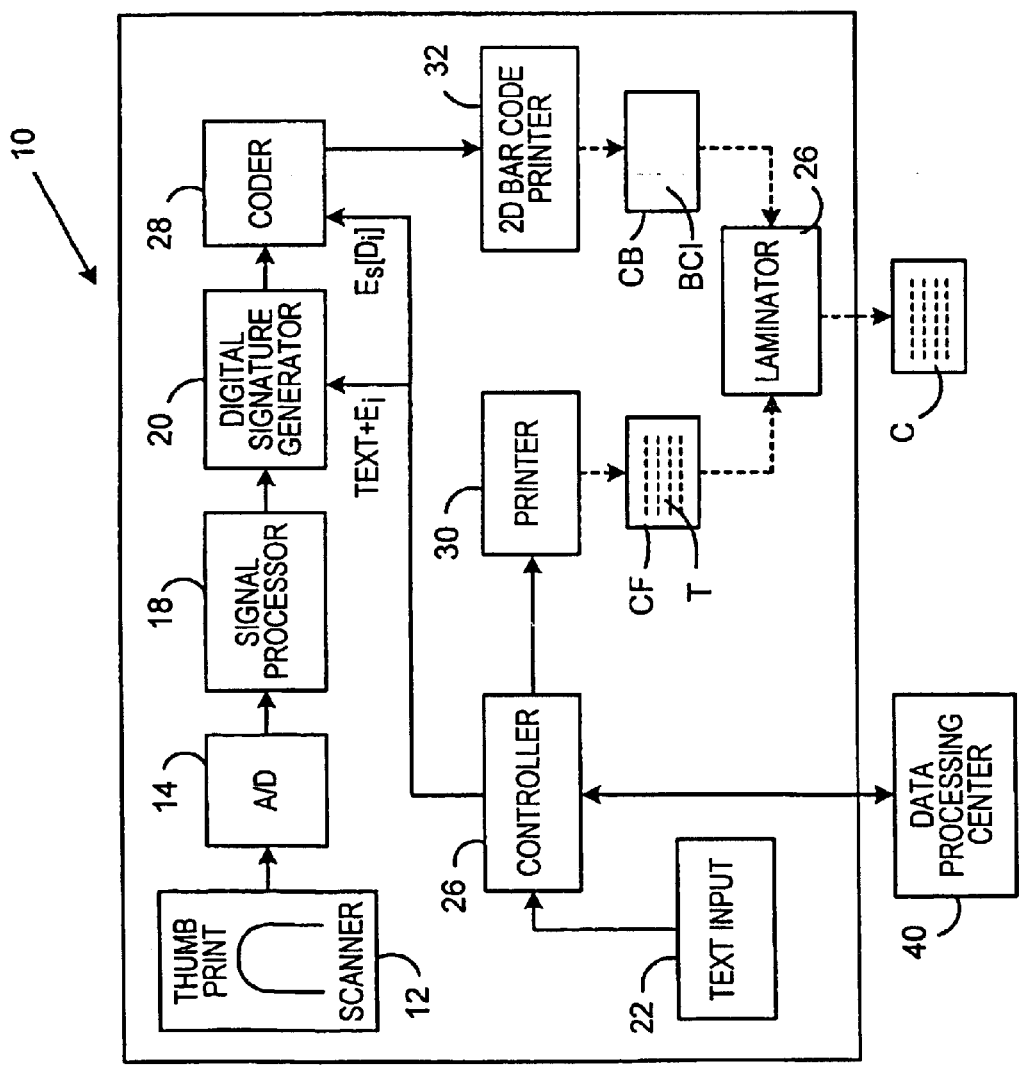
FIG. 1 is a schematic block diagram of an apparatus for providing an identification card in accordance with the subject invention.

FIG. 1 shows an apparatus 10 for providing identification card C. Thumb print scanner 12 provides a signal representative of the thumbprint of an employee or other person to be identified which is converted to digital form by A/D converter 14, and is preferably processed by signal processor 18 to remove noise, enhanced contrast, and, if necessary, to compress the signal to minimize the storage space required.

In general techniques for directly sensing a biometric characteristic such as a thumbprint, hand geometry, facial features, etc. and processing the signal produced to produce a digital signal representative of the biometric characteristic are well known and need not be discussed further here for an understanding of the subject invention.

The output of signal processor 18 is fed to digital signal generator 20 and combined with text input from text input 22 through controller 26 to form a digital file which is then digitally signed with encryption key $E_i$.

Digital signatures are a well known encryption technique. A digital signature for a data file is created by generating a second, smaller data file as a function of the original data file with a "hash" function. This second data file is then encrypted with an encryption key and appended to the first data file as a digital signature. The contents of the original data file can be verified by regenerating the second data file with the "hash" function and encrypting it with the same encryption key to recreate the digital signature. In general any changes in the original data file will cause a change in the digital signature.

While the use of digital signatures is preferred in the subject invention, those skilled in the art will recognize that the validity of data to be incorporated in identification card C can also be protected by simply completely encrypting the entire output of signal processor 18 and text. Accordingly, as used herein, the terms "encryption" and "decryption" are intended to encompass both encryption and decryption of data and the use of encryption techniques to digitally sign and validate digital signatures of data.

The encrypted output of digital signature generator 20 is then input to coder 28 which appends an encrypted decryption key $E_s[D_i]$ consisting of decryption key $D_i$, corresponding to encryption key $E_i$; encrypted with a second encryption key $E_s$. Controller 26 also outputs the text to printer 30 which produces printed text T on card front CF. Coder 28 encodes the digitally signed data from generator 20 and encrypted decryption key $E_s[D_i]$ as a two dimensional barcode format and controls 2D barcode printer 32 to print indicia BCI on card back CB, and card front CF and card back CB are then combined and laminated in laminator 36 to produce card C.

In one embodiment of the subject invention controller 26 communicates with data processing center 40. In this embodiment, where card C is issued by an employer, controller 26 can communicate a record of the issuance of card C to create a record of employment in data processing center 40, or conversely data processing center 40 can control apparatus 10 to issue card C when a person is hired.

In such embodiments where card C is issued only by a single employer it may be preferable to simplify apparatus 10 by not including encrypted decryption key $E_s[D_i]$ and validating the employee's identity using decryption key $D_i$ directly, as will be described more fully below.

In other embodiments of the subject invention where card C may be issued by multiple parties in multiple locations such as union halls, employment offices, training facilities etc. incorporation of encrypted decryption key $E_s[D_i]$ is preferred since then each apparatus 10 may use a different encryption key $E_i$ and compromise of one particular apparatus 10 will not compromise the whole system while validation of the digital signature still only requires a single decryption key $D_s$, as will be described more fully below.

Controller 26 controls the overall timing and operation of apparatus 10 in a conventional manner and the distribution of keys $E_i$ and $E_s[D_i]$ from data processing center 40 and includes a microprocessor which may be an Intel model 80386 or higher capacity model.

While signal processor 18, digital signature generator 20, and coder 28 have been shown as separate elements for clarity of illustration, those skilled in the art will recognize that these elements of the subject invention may be implemented either as discreet hardware elements, or some or all of these elements may be implemented as programming routines in controller 26 or in a separate microprocessor.

Figure 2:
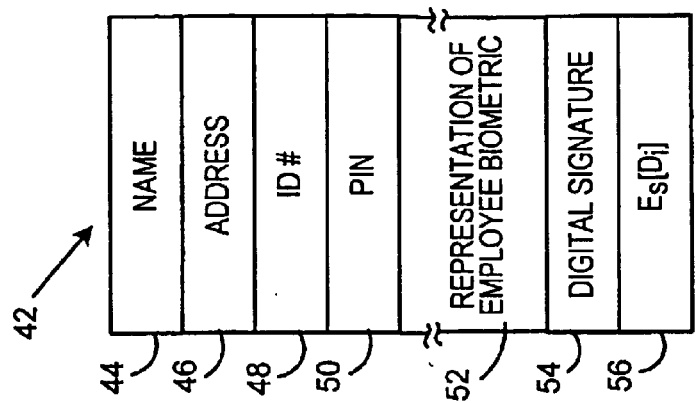
FIG. 2 is a representation of an encrypted data file, including a representation of a selected biometric characteristic, recorded on the identification card of FIG. 1.

FIG. 2 shows a representation of a data file which may be incorporated in indicia BCI. Name 42, address 46 and identification number 48 are input through text input 22. Identification number 48 may be a payroll account number, a social security number, or any suitable identification number which can be used to identify the employee's records. Preferably this information will also be included in printed text T. Additionally, PIN 50 can be included as a further measure of security of identification or to allow card C to be used in applications where a biometric scanner is not available. Element 52 is a digital representation of the selected employee biometric and element 54 is a digital signature of elements 42 through 52 generated by digital signature generator 20, as described above. Finally, in those embodiments where multiple apparatus 10 are used to issue identification cards C by multiple parties encrypted. Encrypted decryption key $E_s[D_i]$ is included for use in validating the employee's identity, as will be described further below.

Preferably card C incorporates the encrypted representation of the employee's biometric characteristic in the form of a two dimensional barcode, such as the known PDF-417 barcode developed by the Symbol Technology Corporation of New York. However, in other embodiments of the subject invention this information may be incorporated using other technologies such as smart cards, memory cards, magnetic strip (where the amount of data needed to describe the biometric characteristic is not to great) or other suitable technology.

A more complete description of the production of identification cards which incorporate a biometric characteristic is given in U.S. Pat. No. 5,384,846; to: Berson et al.: issued: Jan. 24, 1995, which is hereby incorporated by reference.

Figure 3:
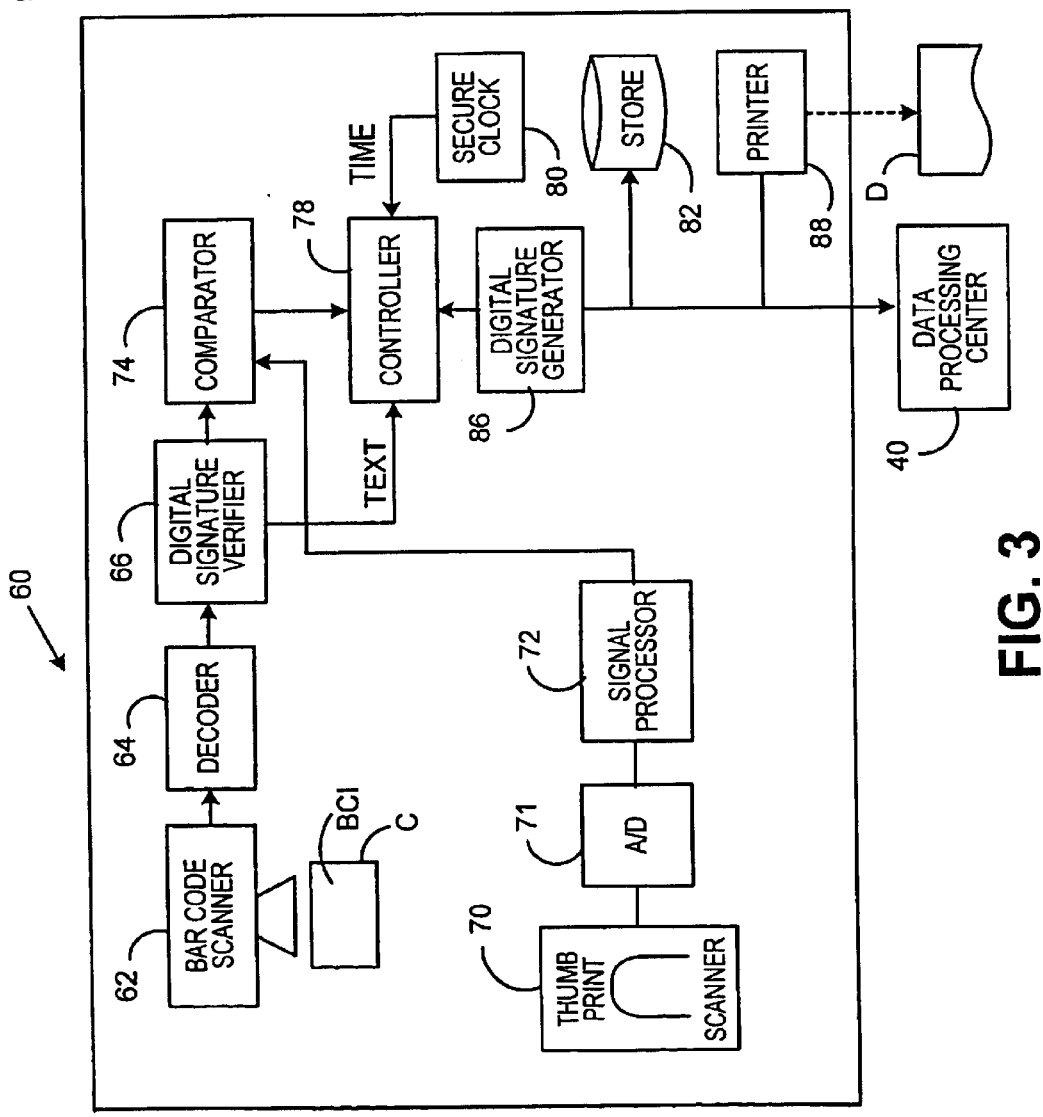
FIG. 3 is a schematic block diagram of an apparatus for validating an employees identity and recording the employee's times of arrival and departure.

FIG. 3 shows an apparatus for verifying the identity of an employee and securely recording the employee's times of arrival and departure at a job site or other location. Indicia BCI is read from card C by barcode scanner 62 and the output of scanner 62 is decoded from the two dimensional barcode format by decoder 64 to provide a first signal representative of the selected biometric characteristic of the employee.

At the same time the employee places his or her thumb on thumbprint scanner 70 to directly sense the selected biometric characteristic. The output of scanner 70 is converted to digital form by A/D converter 71 and processed by signal processor 72 in the same manner described above with respect to A/D converter 14 and signal processor 18.

Signal processor 72 thus provides a second signal directly representative of the selected biometric characteristic of the employee while verifier 66 provides a first signal which is a verified representation of the selected biometric characteristic as recorded on identification card C. If the signals compare then the employee's identity is verified.

Once the employee's identity is verified controller 78 combines verified textual information from verifier 66 with time information from secure clock 80 to record the approximate time of comparison as a time of arrival or departure for the identified employee. Controller 78 then stores this cumulative record in store 82. Preferably the record will be digitally signed by digital signature generator 86 to prevent tampering.

In one embodiment of the subject invention controller 78 controls printer 88 to output a printed record of the employee's time at the job site. Preferably this record will be encrypted so that it cannot be altered. This record may be used by the employee as a personal record of time, or may be presented by the employee to a paymaster as proof of time worked.

Controller 78 also communicates with data processing center 40 to periodically upload time records for the employee. Center 40 uses these time records to determine the employee's wages either to generate paychecks or to separately verify payments made to employees.

In a preferred embodiment of the subject invention apparatus 60 will be capable of stand alone operation and will only communicate with data processing center 40 periodically. In general this is believed preferable since apparatus 60 may be used at multiple and verifying locations and provision of continuous communication may prove difficult. However, in other embodiments where on-line operation is feasible, the functions of signature verifier 66, comparitor 74, secure clock 80, store 82, and digital signature generator 86 can all be carried out in data processing center 40 or other remote location to provide increase security against direct physical assaults on apparatus 60.

In this regard it is a particular advantage of the subject invention that, when identification card C is produced as shown in FIG. 1 above even a successful physical assault on both apparatus 10 and apparatus 60, such that all information in the apparatus is obtained, would not enable an unauthorized party to produce counterfeit identification cards.

As with apparatus 10, controller 78 includes a microprocessor which is preferable an Intel model 8386 or a microprocessor of greater capability, and the functions of decoder 64 verifier 66 comparitor 74 signal processor 72 and signal generator 86 can each be carried out either by discreet hardware modules, or software routines running in controller 78 or other processor.

Figure 4:
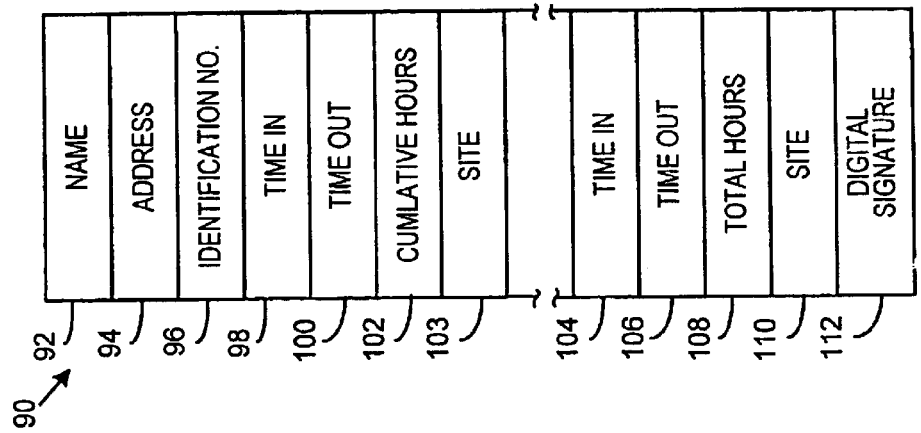
FIG. 4 is a representation of an encrypted data file recording an employee's time of arrival and departure at a location.

Turning to FIG. 4 representation 90 shows a typical record for an employee. Name 92, address 94, and identification number 96 are derived from verified text information generated by digital signature verifier 66. Times 98 and 100, which are either times of arrival or departure are derived from clock 80, which is secured against tampering by unauthorized parties by means of any known, suitable technology, such as embedding clock 80 in epoxy. Records of cumulative hours 102 and site identification are also included for forensic purposes. Record 90 is cumulative and also includes total hours 108; and is digitally signed to prevent forgery.

The embodiments described have been given by way of illustration only and numerous other embodiments of the subject invention will be apparent to those skilled in the art from consideration of the detailed description set forth above and the attached drawings. Accordingly, limitations on the subject invention are to found only in the claims set forth below.

What is claimed is:

1. A time keeping system for tracking a person's time at a location, said person having identification means, said identification means including an encrypted representation of a selected biometric characteristic of said person, said system comprising:

a) a data processing center;
   b) means for providing said identification means, said providing means communicating with said data processing center to record provision of said identification means to said person;

means for validating said person's identity and for recording said person's times of arrival at, and departure from, said location, said validating and recording means comprising:

c1) a clock
   c2) means for comparing, including means for inputting said encrypted representation and for directly sensing said biometric from said person, said inputting and sensing means being physically present at said location, said means for comparing said encrypted representation with said biometric characteristic as directly sensed from said person to verify said person's identity; and
   c3) means, responsive to said clock and said comparing means, for recording said person's times of arrival at, and departure from, said location if said comparison means verities said person's identity, for communicating said person's time at said location to said data processing center; and
   c4) for printing an encrypted record of said person's time at said location.

2. A system as described in claim 1 wherein said clock is secure against being reset by unauthorized parties.

3. A system as described in claim 1 wherein said person is an employee and said data processing center determines said person's wages in accordance with said time at said location.

4. A system as described in claim 1 wherein said times of arrival and departure are encrypted prior to communication to said data processing center.

5. A system as described in claim 1 wherein said times of arrival and departure are encrypted prior to recording.

6. A system as described in claim 1 wherein:

a) said representation of said selected biometric is encrypted with an encryption key $E_i(D_i)$;
   b) said identification means further includes an encrypted decryption key $E_s$;
   c) said means for comparing stores a decryption key $D_s$ corresponding to said encryption key $E_s$; and,
   d) said means for comparing decrypts said encrypted decryption key $E_s(D_i)$ with said key $D_s$ to recover said decryption key $D_i$ and decrypts said encrypted representation of said selected biometric characteristic with said decryption key $D_i$.

7. A system as described in claim 6 wherein said keys $E_s/D_s$ are an encryption/decryption key pair for a public key encryption system.

* * * * *